M. FIEBIG.
BENT DOWEL FOR TIMBER JOINTS.
APPLICATION FILED FEB. 1, 1922.
1,436,584.
Patented Nov. 21, 1922.
2 SHEETS—SHEET 1.
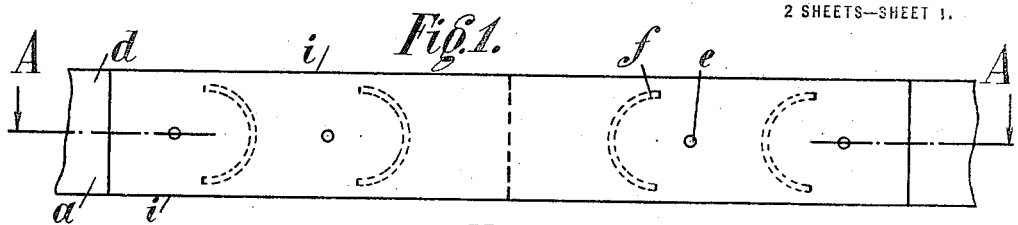
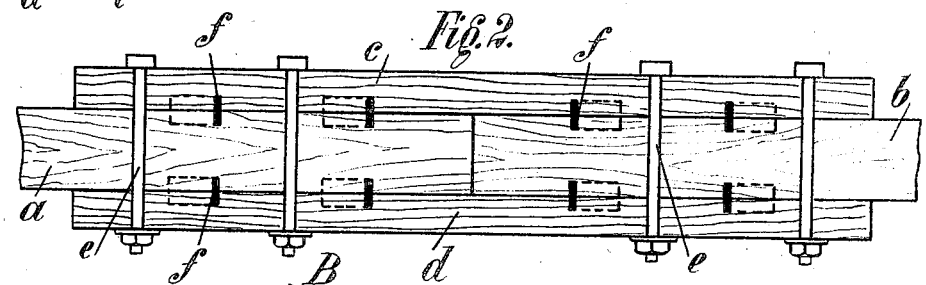
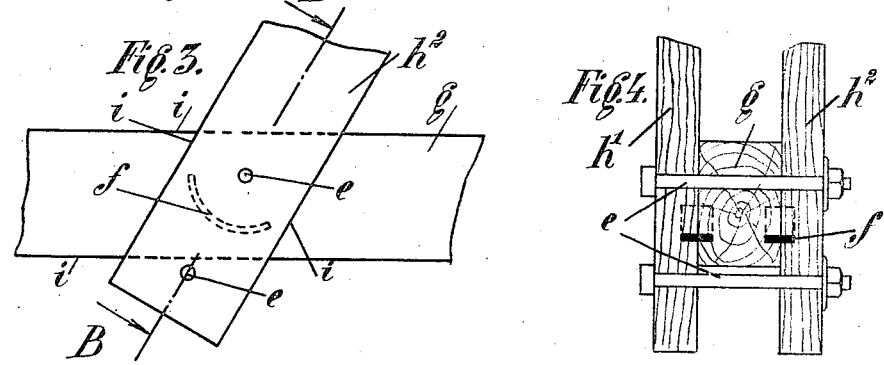
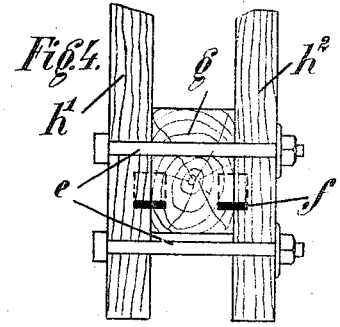
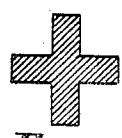
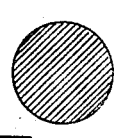

Patented Nov. 21, 1922.

1,436,584

UNITED STATES PATENT OFFICE.

MAX FIEBIG, OF BRESLAU, GERMANY.

BENT DOWEL FOR TIMBER JOINTS.

Application filed February 1, 1922. Serial No. 533,628.

*To all whom it may concern:*

Be it known that I, MAX FIEBIG, a citizen of the German Republic, residing at Breslau, Germany, have invented certain new and useful Improvements in Bent Dowels for Timber Joints, of which the following is a specification.

This invention relates to a timber joint comprising two wooden members having contacting faces with grooves which do not extend to the outside surfaces of the wooden members and a dowel curved around an axis which stands perpendicular to the contacting faces, open at one side for its entire width and having a portion projecting into each groove.

The timber joints of known type with curved dowels open upon the entire width, in which the axis of curvature of the dowel is parallel with the contacting faces of the wooden members, are not suited for timber joints with very great forces occurring in the wooden members, for instance for the longitudinal connection of wooden beams in high wooden building constructions as the shearing faces produced in the wooden members are only comparatively small and can not be made as large as necessary for being adapted to the great forces occurring with out considerable increase in material for the dowel. For the transmission of great forces only the timber joints by means of curved dowels are suited in which the axis of curvature of the dowel is perpendicular to the contacting faces of the wooden members.

In comparison with the known wood joints by curved dowels open over the entire width having the axis of curvature standing perpendicular to the contacting faces of the wooden members and extending to the outside surfaces of the wooden members the improved wood connection presents the advantage that with the same quantity of material of the dowels the security against shearing is increased for the parts of the wooden members which push against the dowel in the direction in which the strain acts. It is true that the new wood connection has this advantage in common with the wood connections of known type in which a ring dowel with the axis of curvature standing perpendicular to the contacting faces of the wooden members is used which is slit in the direction of its length. Dowels of this type are wasteful, because they require more material than corresponding dowels of my invention, and moreover, cutting the grooves for said ring dowels results in each case in an insulated core of wood that is liable to be shorn away.

The dowels according to this invention can be made from any convenient material possessing resistance to bending strain, for instance metal, hard wood or the like. The curvature of the dowel can vary.

The dowels could be curved for instance along a curve which has at all points the same radius of curvature or they could be composed of several curved parts having each a different radius of curvature, or of straight and bent parts or only of straight parts disposed at an angle to each other.

The dowels according to this invention can be used in wooden constructions for the same purpose as the dowels of known shapes.

The accompanying drawing shows by way of example in—

Fig. 1 a covered joint with semi-circular dowels.

Fig. 2 is a section on line A—A of Fig. 1.

Fig. 3 shows the assemblage of two frame work members upon a beam member by means of two parabolically curved dowels.

Fig. 4 is a section on line B—B of Fig. 3.

Figs. 5 to 14 show in plan view various forms of curved dowels.

Figs. 15 to 19 show the sectional views of the various blanks from which the dowels shown in Figs. 5 to 14 may be made.

In the form of construction shown in Figs. 1 and 2 the two wooden members $a$, $b$ contacting with the end faces are covered by the butt straps $c$ and $d$ with which they are connected by semi-circular dowels, which do not extend to outside surfaces $i$ of the wooden members, and by bolts $e$.

In the form of construction shown in Figs. 3 and 4 two inclined wooden members $h'$ and $h^2$ are joined to the two outside surfaces of a horizontal wooden member $g$ by means of the dowels $f$ curved in parabolic shape and not extending to the outside surfaces $i$ of the wooden members and by means of a middle bolt $e$; below the wooden member $g$ the two wooden members $h'$ and $h^2$ are further connected by a bolt $e$.

Figure 20:
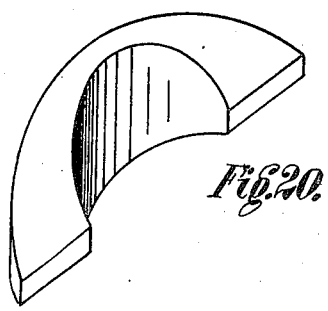
Figs. 20 and 21 show some of the forms of the dowel in perspective view.
Figure 21:
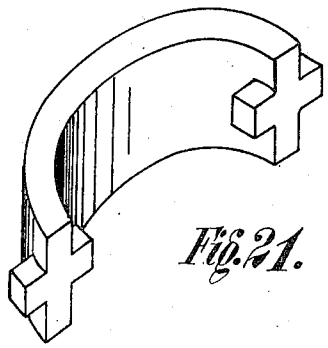

The cross section of the dowel can be the same over the entire length of the dowel or the cross sections can vary, for instance a dowel being of upright rectangular cross section (Fig. 15) at the apex can merge towards the ends (see Fig. 20) into a flat rectangular cross section or (see Fig. 21) the dowel may have cross-shaped ends as shown in Fig. 21.

I claim:—

1. A timber joint comprising two wooden members having contacting faces with grooves which do not extend to the outside surfaces of the wooden members and a dowel curved around an axis which stands perpendicular to the contacting faces, said dowel being open at one side for its entire width and having a portion projecting into each groove.

2. Improved means for joining two members together comprising a dowel adapted to be received in corresponding alined grooves in the contacting faces of said members, and having a central portion of rectangular cross section and portions extending therefrom in the same direction and having cross shaped ends.

In testimony whereof I affix my signature in presence of two witnesses.

MAX FIEBIG.

Witnesses:
ERNST KATZ,
FELIX NERODF.